(12) United States Patent
Brown et al.

(10) Patent No.: US 7,693,185 B1
(45) Date of Patent: Apr. 6, 2010

(54) METHOD AND APPARATUS FOR CREATION AND MANAGEMENT OF INTELLIGENT PACKETS

(75) Inventors: Bruce E. Brown, Orem, UT (US); John D. Smith, Lehi, UT (US); D. Brent Israelsen, Alpine, UT (US); Mark M. Mussman, West Chester, OH (US)

(73) Assignee: DigitalBridge Holdings, Inc., Orem, UT (US)

( * ) Notice: Subject to any disclaimer, the term of this patent is extended or adjusted under 35 U.S.C. 154(b) by 302 days.

(21) Appl. No.: 11/821,256

(22) Filed: Jun. 22, 2007

Related U.S. Application Data

(60) Provisional application No. 60/838,083, filed on Aug. 16, 2006.

(51) Int. Cl.
*H04J 3/24* (2006.01)
(52) U.S. Cl. ........................ 370/474; 715/231; 715/234; 715/760; 712/201
(58) Field of Classification Search .......... None
See application file for complete search history.

(56) References Cited

U.S. PATENT DOCUMENTS

| 2002/0055958 A1* | 5/2002 | Edwards et al. ............. 707/514 |
| 2002/0112143 A1* | 8/2002 | Matsuura et al. ............. 712/25 |
| 2004/0077334 A1* | 4/2004 | Joyce et al. ................. 455/406 |
| 2008/0022386 A1* | 1/2008 | Shevchenko ................. 726/12 |

\* cited by examiner

*Primary Examiner*—Hong Cho
*Assistant Examiner*—Ajay P Cattungal
(74) *Attorney, Agent, or Firm*—ColterJennings

(57) ABSTRACT

A method and apparatus for the computerized management of a digital ecosystems through the creation and management of intelligent information packets that enable computerized management of the creation, flow, and use of electronic and optically scanned paper documents. An XML packet is structured to combine document data, comprising electronic or optically scanned documents, with rules, work-flow controls, audit capability, and signature controls. Tamper proofing ensures validity of information, such as legal documents, that requires proof and tracking of official origin, approval, or status.

31 Claims, 12 Drawing Sheets

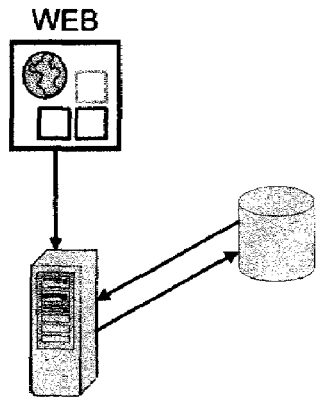

```
< dwf:DWF >
...
  < dwf:Commands >
    < dwf:CommandSet name=" BondForfeit " type="eWarrant">
    < dwf:GroupEvents sequenceId ="1" status="">
      < dwf:TVE linkName =" CaseNum " Id="TVE1" governance="ClerkOfCourt"
        status="complete"/>
      < dwf:TVE linkName ="ICIS" Id="TVE2" governance="keyToSign" status=""/>
      < dwf:TVE linkName =" ViewToUI " Id="TVE3" governance="" status=""/>
    </ dwf:GroupEvents >
    < dwf:if >
  < dwf:condition >
  // j:CaseParticipants/j:CaseDefendantParty.Person/j:PersonAlias/j:
    PersonName/j:PersonFullName=Roopali
  </ dwf:condition >
      < dwf:then >
        < dwf:GroupEvents sequenceId ="2" status="">
          < dwf:Route linkName =" CourtClerk " Id="R1" governance="" status=""/>
        </ dwf:GroupEvents >
      </ dwf:then >
        < dwf:else >
          < dwf:GroupEvents sequenceId ="8" status="">
            < dwf:Route linkName ="PSA" Id="R2" governance="" status=""/>
          </ dwf:GroupEvents >
        </ dwf:else >
        </ dwf:if >
```

Figure 4a

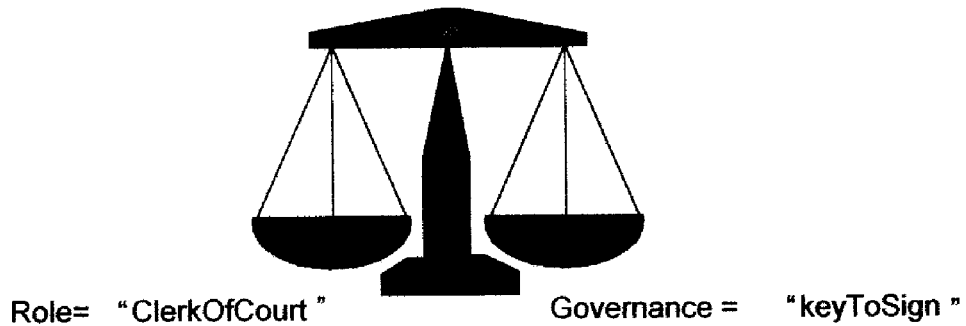

Role= "ClerkOfCourt"        Governance =    "keyToSign"

```
< dwf:DWF     >
...
< dwf:Governances        >
    < dwf:RoleGroups       >
      <! -- this is who I am     -->
      < dwf:RoleGroup      name="PSA">
        <! -- keys I have    -->
        < dwf:Key    > keyToView    </ dwf:Key   >
        < dwf:Key    > keyToSign    </ dwf:Key   >
      </ dwf:RoleGroup     >
      < dwf:RoleGroup      name=" ClerkOfCourt   ">
        < dwf:Key    > keyToSign    </ dwf:Key   >
        < dwf:Key    > keyToView    </ dwf:Key   >
      </ dwf:RoleGroup     >
    </ dwf:RoleGroups      >
```

Figure 12

```xml
<dwf:CommandInstructions>
  <dwf:TVEs>
    <dwf:TVE linkName="CaseNum" Id="TVE1">
      <dwf:Instructions>
        <dwf:Instruction>
          <!--Start-->
          <dwf:Commands>
            <dwf:Command type="xslt" Id="T1" postProcessAdapter="PortalUI">
              <xsl:stylesheet version="1.0" xmlns:xsl="http://www.w3.org/1999/XSL/Transform">
                <xsl:template match="/">
                  <xsl:copy-of select = "/DWF/AnswerTables/AnswerTable[@type='DB-
                    FLAT']/Envelope/MessageBody[@fileName='StartWarrant.html']"/>
                </xsl:template>
              </xsl:stylesheet>
            </dwf:Command>
            <dwf:Exceptions></dwf:Exceptions>
          </dwf:Commands>
          <dwf:Validates>
            <dwf:ValidateCommand type="xslt" Id="V1">
            <xsl:stylesheet version="1.0" xmlns:xsl="http://www.w3.org/1999/XSL/Transform"
              xmlns:j="http://www.it.ojp.gov/jxdm/3.0.2">
              <xsl:template match="/">
                <xsl:element name="list">
                  <xsl:if test="$param_case_num=''">
                    <xsl:element name="item">
                      <xsl:attribute name="name">CaseNumber</xsl:attribute>
                      <xsl:attribute name="error">true</xsl:attribute>
                      Case number is blank
                    </xsl:element>
                  </xsl:if>
                </xsl:element>
              </xsl:template>
            </dwf:ValidateCommand>
              <dwf:Targets>
                <if>
                  <condition>some uri based upon the output created by
                    ValidateCommand</condition>
                  <then>
                    <dwf:Target type="" Id="T1" postProcessAdapter="MQ" ></dwf:Target>
                  </then>
                  <else>
                    <dwf:Target type="xslt" Id="T1" postProcessAdapter="DB" >some xslt to
                      convert output to the correct imput for DB</dwf:Target>
                  </else>
                </if>
              </dwf:Targets>-->
              <dwf:Exceptions></dwf:Exceptions>
          </dwf:Validates>
```

Figure 13

```
<dwf:DWF ...>

<dwf:AnswerTables>
    +<dwf:AnswerTable type="local" name="local" Id="at1"/>
    +<dwf:AnswerTable type="gjxml" name="arrest" Id="2"/>
    <dwf:AnswerTable type="DB-FLAT" name="" Id="3">
      <dwf:Envelope>
        <dwf:MessageBody fileName="PreTrialServicesArrestWarrant.html" mime="text/html"
          encoding="">
          <html>
            <head>test
            </head>
            <body>
              <div id="mainView">Hi
              </div>
            </body>
          </html>
        </dwf:MessageBody>
        <dwf:Attachments>
          <dwf:Attachment name="myImage.gif" mime="image/gif" path="" encoding="">Plain
            text</dwf:Attachment>
          <dwf:Attachment name="myImage2.gif" mime="image/gif" path="C:/myImage2.gif"
            encoding="base64">slkfjdjfsl</dwf:Attachment>
        </dwf:Attachments>
      </dwf:Envelope>
      <dwf:Envelope>
```

Figure 14

METHOD AND APPARATUS FOR CREATION AND MANAGEMENT OF INTELLIGENT PACKETS

CROSS-REFERENCE TO RELATED APPLICATIONS

This application claims priority based on co-pending U.S. Provisional Application Ser. No. 60/838,083 filed Aug. 16, 2006, the disclosure of which is incorporated herein by reference.

BACKGROUND

The present invention relates generally to the management of a digital ecosystem through the creation and management of intelligent packets that enable computerized transactions using electronic and optically scanned paper documents. A lack of cultural, policy, process and technology interoperability and protected information sharing between organizations today has led to the failure of government institutions and business entities to enable efficient management of processes critical to their respective missions. Evidence of such lack of interoperability ranges from the infamous 9/11 attacks, where the intelligence institutions failed to identify and thwart terrorists, to relief efforts in the wake of hurricane Katrina, where the justice, education and healthcare institutions failed to adequately preserve and share records, to the day-to-day reality of American justice institutions at the federal and state levels routinely tolerating backlogs of millions of un-served federal, state and local arrest, search and bench warrants.

Even with the purported speed and virtually unlimited storage capacity of modern computers, networks, and the internet the "system" in its current state isn't working.

Information and transactions critical to public safety, homeland security, justice, education, healthcare, and other essential government institutions and services are routinely unavailable, delayed or lost due to a lack of interoperability between federal, state and local government jurisdictions and businesses on a number of levels. Business enterprises suffer a similarly lack of interoperability both internally and in relationships with suppliers, service providers, partners, distributors, and customers.

Succinctly stated, the problem is the inability to fluidly share critical information in real-time among government organizations at all levels and among appropriate business entities—while preserving the required levels of authority, security and privacy. Finding the proper balance between sharing critical information and maintaining the expected authority, privacy and security over that information is one of today's most pressing challenges.

The critical element that is lacking in harnessing modern computer power and networking connective to address these issues is a digital ecosystems that binds together government and business organizations into functional entities and digital ecosystem transactions that operate to bridge the gaps between these entities to allow them to function as a single, coherent system. Digital ecosystems and the digital ecosystem transactions that they can enable allow partners in government and business to act more quickly, assuredly, and decisively based on having the right information in the right context in order to make better decisions. In particular in justice, education, and healthcare ecosystems which affect the lives of virtually all men and women can benefit from the creation of ecosystems that enable these entities to act more quickly, assuredly, and decisively based on having the right information in the right context in order to make better decisions.

Efforts to find technical solutions to address the perceived need for a digital ecosystem have fallen short of the goal. In the past, developers have used object-oriented programming to enable more efficient programming and maintainability for such systems and have turned to hardware independent languages like JAVA. Subsequently, technology to facilitate communication among distributed objects across client-server lines has been enabled by the EnterpriseJavaBeans architecture.

However, there these technologies fall short of enabling a complete ecosystem in which disparate systems may work together effectively and transparently. Accordingly, government and business systems are leverageing the power of the Extended Markup Language (XML) protocol for process communication and data transmission between clients and servers and among servers. Thus, there is a need a clear need for a digital ecosystem architecture that can provide not only platform independence, but that accommodates highly abstracted metadata process for including user both electronic and historical paper-based documents through their creation, flow, approval, and retention cycles.

The current invention describes a unique technology platform that enables digital ecosystems and delivers digital ecosystem transactions to users in government and business.

SUMMARY OF THE INVENTION

The present invention provides an architecture that creates a viable digital ecosystem and delivers digital ecosystem transactions that allow true interoperability between different cultures, processes, policies and systems. This architecture enables the focus to be on an individual or an event, rather than on a specific organization within the ecosystem. Using the intelligent packet technology embodied in the invention government organizations and appropriate business entities that operate in "government or business ecosystems" can share protected and proprietary information by building digital bridges between them. These digital bridges allow participants to form a structured and controlled digital ecosystem to share a broad spectrum of in-context information in real-time while preserving process, policy, authority, privacy and security around that information.

The implementation of these controls facilitates the sharing of information among members of the ecosystem while preserving safety, privacy, and more efficient delivery of services to individuals, with particularly well defined benefits in the areas of government and legal services, education, and healthcare. At the same time the digital ecosystem architecture enabled by the invention helps reduce the cost, time and risk associated with government and business processes. The invention also eliminates or transcends many of the barriers to interoperability of today's incompatible legacy information systems.

The advent of XML (Extensible Markup Language) as a globally accepted information-sharing standard has provided a key building block of the information exchange. XML has quickly become the standard language for electronic transactions, providing something that other integration standards have failed to provide thus far—ubiquity. This information exchange packet is the key to bridging the gaps in a digital ecosystem and allowing efficient sharing of data, documents, and processes among vertically organized entities that would otherwise be "information silos".

While most users of XML have accepted and regarded it as a data-sharing standard, it is actually much more. Coupled with the other components of the invention's architecture, it allows all of the elements of an electronic transaction to be bundled together into an integrated intelligent packet that maintains the "context" and relationships of its individual components including data, files, images, signatures, workflow, audit trail, and applicable policies.

With all information remaining in the appropriate context, the integrated transaction behaves in a similar fashion to the more familiar paper transaction. XML allows data elements to be given meaning by tagging and categorizing, or "naming" them within the context of the source document, and within the context of the process as a whole. This means that the computer can read the tagged information rather than requiring a person to retype the information when it moves from one silo in the ecosystem to another. The invention's XML-based packet technology, provides the best of both worlds—the speed, integration and security of the digital world combined with the assurance that all of the information will always be "in-context" just like the traditional paper-based transaction.

The architecture described by the invention utilizes a platform for automating event driven processes, as all government and business processes essentially revolve around initiating or responding to events. The XML packet is a central element of the event driven architecture and is interpreted by the platform. The architecture embodies or enable subsidiary applications that create, populate, edit, view, modify and audit a process via the XML packet. The XML packet serves as a secure, transferable repository for the following types of in-context information:

1. Data and source documents
2. User and agency-specific access controls
3. API's and extended services instructions
4. Audit logs and tamper-proof seals
5. Document and data view, report and export templates The XML packet contains some instructions that the platform interprets to perform the process that was started by the event. This may include accessing a database to retrieve required data, displaying the data in a document, and then allowing the user to modify and sign the document. After signing the document the data can be extracted and placed in another external database.

Since all of the access rights, rules and workflows necessary to process the packet over its lifecycle are contained in and transferred with the data, any authorized person in any constituent organization that comprises part of the defined digital ecosystem can use the platform to access the in-context data appropriate to need of their organization, based on the permissions they have been granted. As a result, digital ecosystem members can share their information with any other member, confident that all appropriate access protocols are being maintained. Members aren't required to update or replace their application systems in order to gain access to this shared, in-context information from other agencies.

The invention defines a platform that provides digital ecosystems with the means to interact with outside organizations, maintaining the confidence of hard copy transaction records without the inefficiencies and costs of managing paper. This platform represents a fundamentally different approach to in-context data sharing that acknowledges the political and technical realities of the digital ecosystem, which is comprised of separate agencies possessing separate and often-competing agendas. It capitalizes on the investments and efforts made to date by each organization, and it makes full use of emerging data standards without requiring retrospective conversion of existing data. The described platform allows ecosystem members to retain and replace their internal systems and applications as they choose while enjoying access to the external, in-context information required for their operations.

The platform defined by the invention was developed to support multiple threat levels, such as those dictated by the United States' Homeland Security Advisory Systems. Each of the event driven processes can operate at different levels or the specific actions allowed in a process can be at different levels. This means that the risk of the processes can be mitigated be allowing the owner of the process to specify the level of security for each step. The actions undertaken with each step of a document flow are also recorded in a permanent audit log to show who did what and when it happened in the process. Document encryption can also be used as required.

The platform enables the delivery of transactions as hosted Web Services and provides an environment for users to build information sharing relationships across organizational boundaries worldwide and to fundamentally change current business processes. In a true digital ecosystem multiple organizations in different locations must be efficiently connected. This inventions architecture allows this to be done with the platform in two different ways allowing the users to make the choice. The platform can hosted centrally in a secure data center (third party) or the organization can host the platform in its own data center (first party).

Since the platform may be written in Java, among other computer languages, it can run on Unix, Linux, and Windows servers. The XML packets can be moved from system to system to perform their processes. Each time the packet is moved it is tamper sealed and, optionally, fully encrypted before being sent over an SSL channel to another server. To communicate among the disparate members of a digital ecosystems using XML standards must be implemented. One embodiment of the invention adopts the NIEM (National Information Exchange Model) as the basis of the interchange. Other standardized schemas exist for specific industries and functions. Examples of widely adopted schemas include:

1. Justice: GJXDM
2. Education: SIF
3. Health: HL7 v.3

The architecture defines an XML packet structure that includes data, rules, flow, work, audit, and sign.

The data section contains the data values relevant to the document modeled by the XML packet. The rules section contains the governance instructions.

The flow section contains the high level process instruction. The work section contains the specific commands that the inventions platform itself executes. The audit Section is critical to the integrity of the packet providing a complete audit trail. The sign Section contains digital signatures which act as tamper seals with date and time stamps.

The platform comprises a series of Databases and an engine that interprets and executes the instructions from an XML packet. The engine has a web services interface for the portal which contains the applications for the end user.

The invention embodies an application that incorporates the user interface and first presents a login screen. The user will login at what level of authentication is required by the agency or entity using the system. The invention supports all levels of authentication and utilizes existing LDAP or other databases in the login process known in the art.

The invention provides for a portal that may contain one or more applications. The portal will interpret the application's requests and translate them to web services requests for the engine.

The engine can be implemented in any computer language but in the present embodiment has been written in Java to facilitate hardware independence hardware. The engine can be scaled by adding processors or additional machines in a cluster. The engine is designed to access to its own internal database tables, for storage of templates and documents, and to communicate with external database sources. Data adaptors are provided for external data sources.

The creation of the XML packets that serve as templates for documents is accomplished with an XML editing tool as known in the art.

BRIEF DESCRIPTION OF THE DRAWINGS

Other features and advantages of the present invention will be apparent from reference to a specific embodiment of the invention as presented in the following Detailed Description taken in conjunction with the accompanying Drawings, in which:

FIG. 12 depicts sample XML code for event handling within the system;

FIG. 13 depicts sample XML code to sequentially call services embedded in the XML packet;

FIG. 14 depicts sample XML code to retrieve the required data and return it to the user.

DETAILED DESCRIPTION

Most documents created today are in electronic format. While images can be processed with optical character recognition software (OCR), the optimal approach is to retain and manage documents in their original electronic form. Further much of the supplementary information that accompanies modern documentation is also in electronic format such as digital pictures, digital videos, email, etc. Capturing, storing and then working with such documents should be done electronically.

Figure 1:
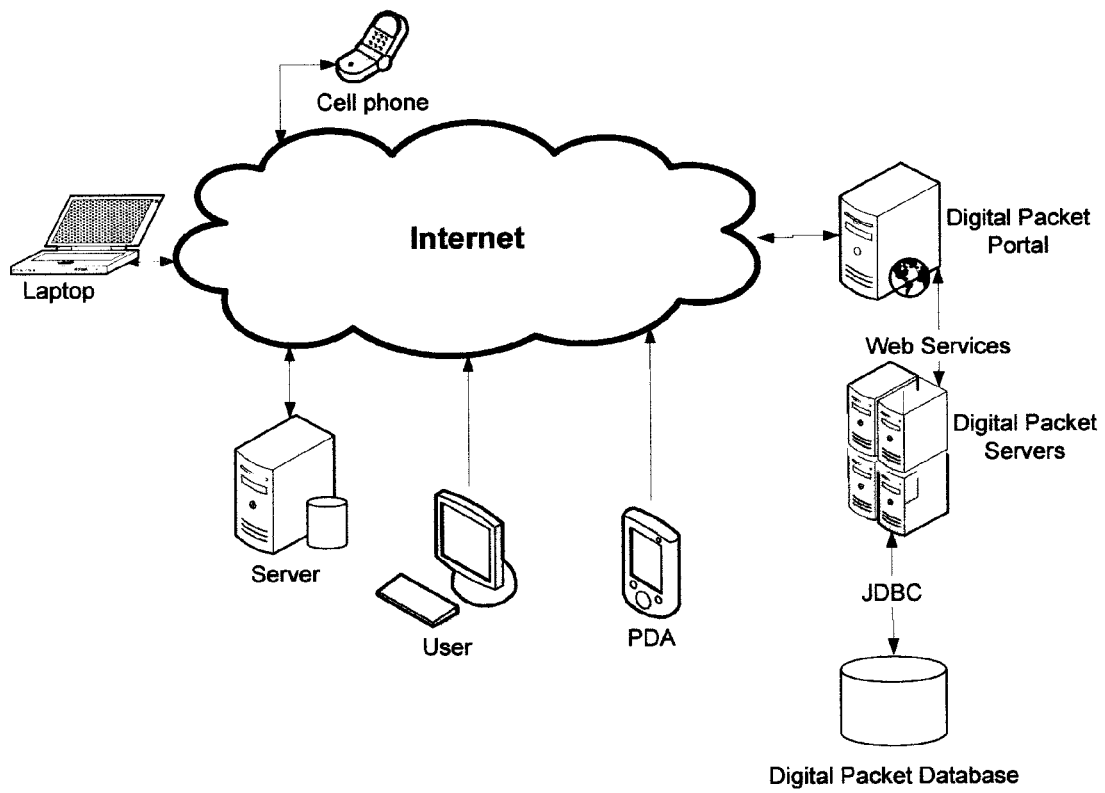
FIG. 1 depicts a configuration of a computer network, including the internet, whereby a server hosting the invention's software is enabled to manage documents.

The creation and management of intelligent packets by the invention is achieved by the creation of a server based system on which the packets are created and which draw from other data sources by means of computer network transmission using standard protocols as known in the art. FIG. 1 depicts a configuration of a computer network, including the internet, whereby a server hosting the invention's software is enabled to manage documents across a wide spectrum of computer devices independent of geographical location, hardware type, operating system and document format.

Figure 2:
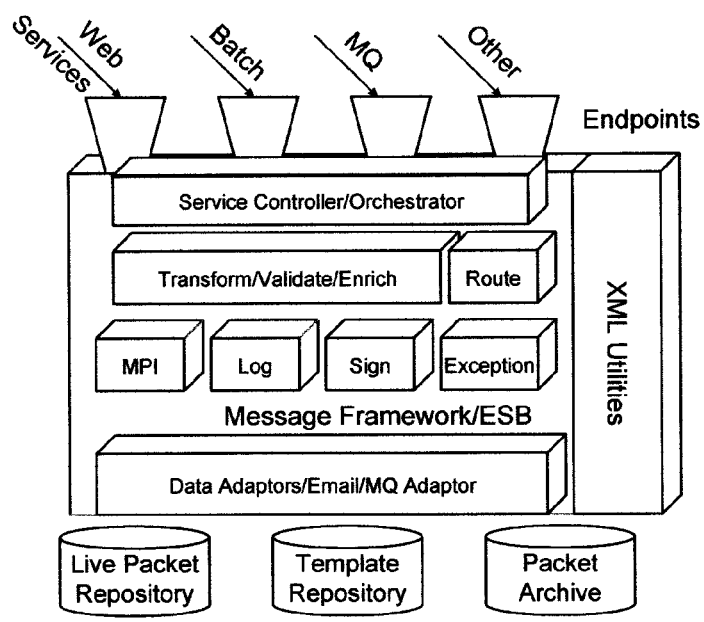
FIG. 2 depicts the high level structure of the system architecture.

FIG. 2 depicts the architecture of the system server that handles the intelligent packet processing, comprising a multiple sources of requirements in the form of triggering events in the form of web services, batch processes, IBM MQ services, or other services based on independently developed API sets. Services are processed by a services controller or orchestrate that calls other capabilities within the server. These include the validation, transformation or enrichment engines, routing, a master person index (MPI), logging capability, digital signing, and exception processing. Data adaptors manage the storage and retrieval of the documents that are stored in template repository, packet archive, and a live packet repository for currently active packets. XML utilities manage other functions germane to the XML format of the packets as required.

The invention is based on event driven computing as known in the art. Using as an example the creation of a digital warrant for the arrest of a individual wanted in connection with a criminal legal process, the process begins with a triggering event. An Event represents an encounter with an activity such as an issuance of a search warrant which is coded as a digital packet. This is handled via a master application grid (MAG) that defines the basic interface for accessing the packet's content. There will be searchable data items in the answer table embodied in the packet and a translation to parse the fields that are searchable and place them in a database.

There will also be a user interface for searching in which the user will pick from a list of searchable items to display as provided by the MAG. The MAG registry contains records for every licensed server that is part of the total MAG grid. Servers may network by means of a publish/subscribe model, as known in the art, whereby each registry publishes its entries to subscribed servers. The MAG registry may then also be used in the management of server load balancing, application redirection, overall application management within the grid and federated queries. In essence, the MAG acts as a master control center for administration of the grid, queries across the grid, decision support, metrics, movement of packets between servers on the grid, management of processes, moving processing between grid servers, stopping processes, and monitoring available server resources.

The packet that includes the required series of instructions for calling the specified server comprises an XML document. The architecture of the invention defines this XML packet structure that includes data, rules, flow, work, audit, and sign as depicted in FIG. 3.

Figures 3, 4:
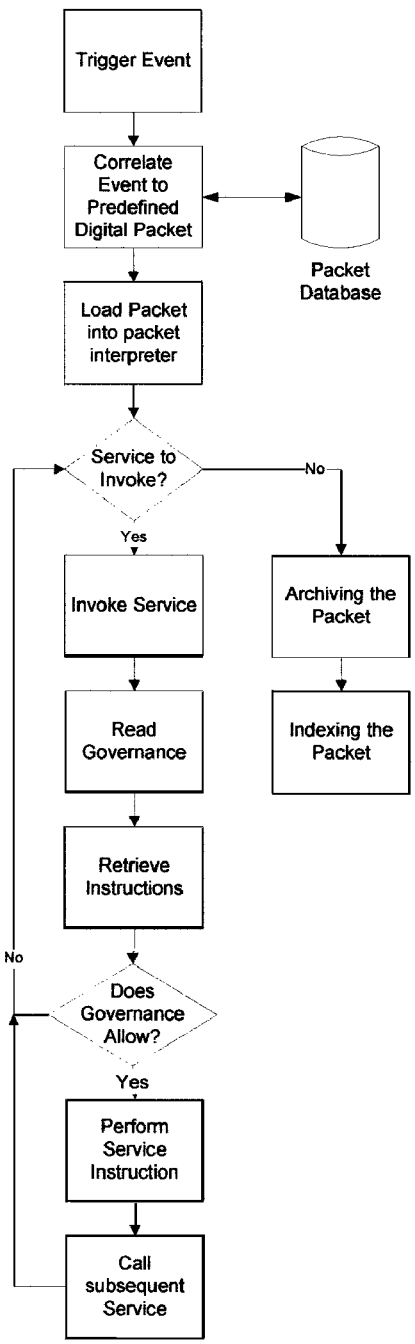
FIG. 3 depicts the XML packet structure.
FIG. 4 depicts data structures within the packet that reference values or information by means of pointers to external systems.

FIG. 4 depicts the logical flow of how the system handles a triggering event. FIG. 4a depicts sample XML code to implement the handling of a triggering event. The triggering event in the example case of an arrest warrant could be the issuance of a warrant based on the filing of in information by a prosecutor or the issuance of an indictment by a grand jury. In these cases the trigger event would be initiated by a user. Alternatively, the triggering event may be generated automatically by the server, for example, the automated issuance of a warrant for an individual when who fails to appear for an arraignment or hearing. In such cases rule based calendaring of events could be used to automatically issue the warrant after a specific date or time lapses without compliance with specified requirements being entered into the system.

The triggering event will, in each case correspond to a packet type, also known as a digital work flow or DWF in the terminology of database management. The packet in the case of this example would include all the forms, rules, flows, and protections required to create, issue, and authorize a warrant.

The packet retrieved in response to the triggering event will include a set of predetermined instructions to execute one or a series of services required to complete the defined workflow. These services may be automated or require human intervention or input.

Figure 5:
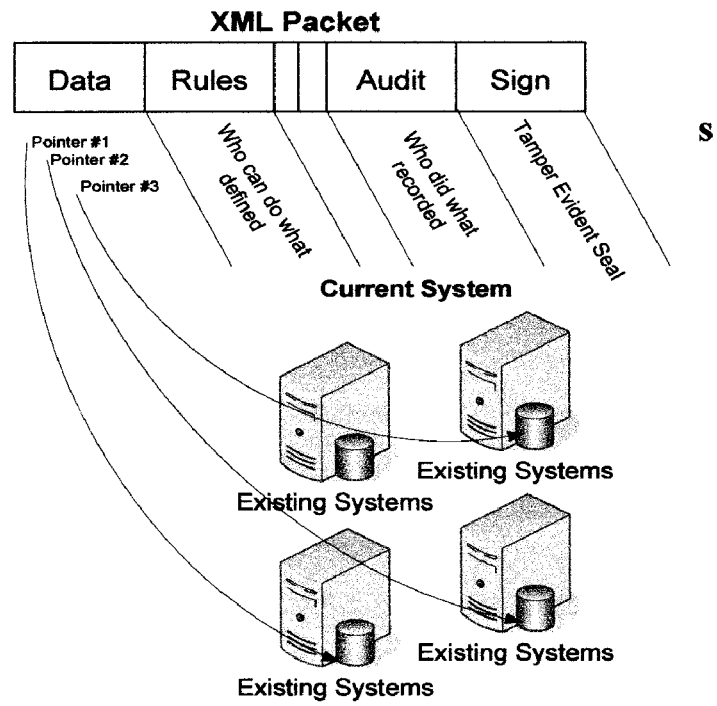
FIG. 5 depicts a graphical representation of how packet segments may reference one another in a hierarchical fashion.
Figure 6:
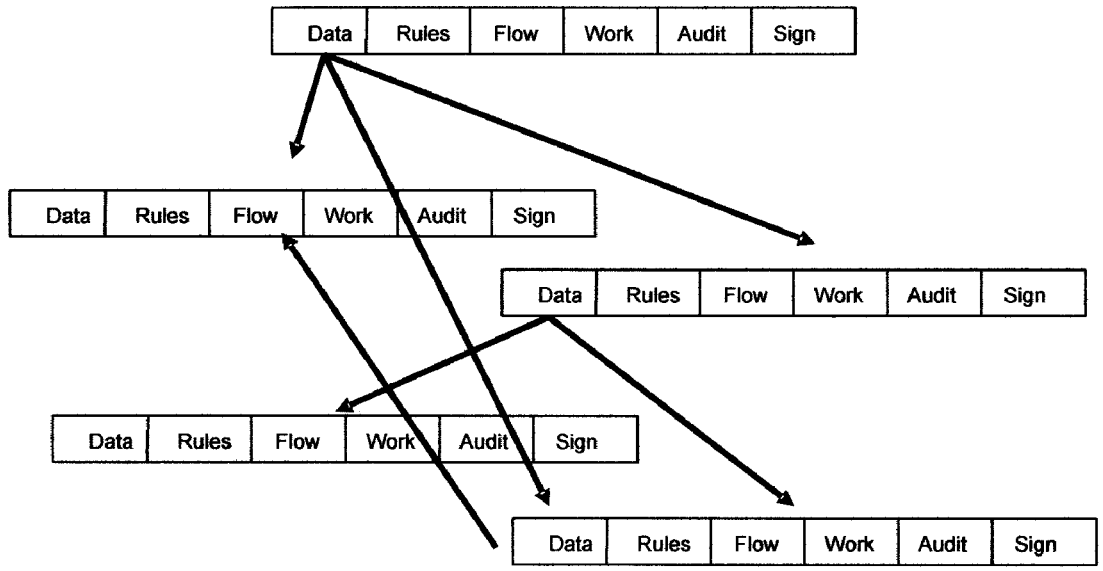
FIG. 6 depicts the handling of an event triggered by user input.

The data section contains the data values relevant to the document modeled by the XML packet, which values may be pointers to other elements or documents. FIG. 5 depicts data structures within the packet that reference values or information by means of pointers to external systems. FIG. 6 depicts a graphical representation of how packet segments may reference one another in a hierarchical fashion by means of pointers. In the present example the documentation required for the warrant, including the warrant itself, could either be directly embedded in the packet or referenced by a pointer to an external document store with the proper form. In a preferred embodiment of the invention, documents to be managed would be represented by templates with fixed data predetermined and rules to call additional services for variables that are required, such as names, addresses, case numbers, etc.

The rules Section contains the governance instructions, including who is permitted view or interact with each other element of the packet as well as security requirements and encryption. Rights can be set at a granular level of specific data elements, at the document level, or for the entire packet.

The flow section contains the high level process instructions. These may include requests to populate a form, obtain signatures from persons with different roles, or forward on the complete document to identified users. In the case of the example using a criminal warrant the name, date of birth, address, and case number would be retrieved from police or court records to populate the required warrant documentation. Other information could be appended as required, including text objects such as prior case histories as well as binary objects such as digitized photos or finger prints. The flows may also include logical decision trees to determine which data may be required or omitted. Once the flows are analyzed they are carried out by instructions in the work section of the packet.

The work section contains the specific commands that the inventions platform itself executes, such as routing a query for information to an appropriate database, converting formats, or processing results according to predetermined rules. This could include, in the case of the example warrant, the retrieving of court records, police files, last known address, a list of contacts, names and contact information for judges and lawyers involved in the case. Virtually any relevant material that is accessible over network connections with proper authorization may be retrieved by including in the packet the requisite instructions for locating the information, authorizing its retrieval, converting it into the proper format, and processing the retrieved information in accordance with predetermined rules described in the packet.

The audit Section is critical to the integrity of the packet and the compliance with mandatory provisions established by the users. The audit trail records each event of the process with information about who accessed the document during the entire process defined in the packet's work flow. This includes both human or system with identification of the specific individual or system, what event took place, what was the result, the date and time with information about the server(s) accessed. The audit information can be maintained at a very granular level or at a high level depending upon the specific needs of the users specified in the XML packet. In the case of the example warrant where legal processes must be strictly observed, the sequence of approvals and their validity could be verified by means of the audit trail to establish that all required legal requirements were duly followed in issuing the warrant.

The sign Section contains digital signatures. Digital signatures, as known in the art, can include electronic signatures validated by secure services, or any other acceptable signature defined by the packet. Binary objects such as voice recordings of an oral authorization could be recorded and their integrity persevered to validate an approval. In the case of the warrant issuance, for example, a judge authorized to approve a warrant could provide telephonic authorization that would be retained in the packet and protected from any subsequent manipulation.

Thus, the digital signature features of the packet also act as tamper seals with date and time stamps. Tamper Seals can be used within documents to evidence specific electronic signatures, or may evidence the integrity of a complete document or the entire packet. This process ensures that the XML packet contains the original data and has not been tampered with, including modification or even viewing by unauthorized persons. Any attempt to revise a document after approval, for example, would not only be rendered ineffective, but would be recorded in the audit log to enable subsequent forensic analysis of attempts to circumvent the authorized flow defined by the packet.

The packet including the above elements, once retrieved in response to a triggering event, is loaded into a packet interpreter capable of interpreting that packet type. The interpreter determines the presence or absence of a control-flow language that governs the sequence and logic for invoking services. The logic embodied in the control flow can include the selection from multiple options, if-then statements, loops, and other standard logical flows to an arbitrary level of complexity.

Upon determining the presence of instructions in the flow section of the packet, the first service identified in the flow is invoked and carried out in accordance with instructions embedded in the packet. This is achieved by implementing a series of predefined steps as follows:

The first step consists of reading any governance criteria associated with the service, including access rights, role definitions, or time constraints associated with the first service to determine if any portions of a result generated by the service requires limitation, restriction, modification, or redirection. FIG. 12 represents sample code to determine roles and access for governance purposes.

The second step is to retrieve the instructions for the first service and determine whether the governance criteria read in the first step permit performance of the service. If the governance criteria permit performance of the first service, the instructions for that service are performed using the embedded control language or logic associated with that service. The result generated by following the instructions in the service is saved in accordance with any governance criteria that may apply. The result may then be validated using predetermined criteria. For example, names or addresses of wanted individuals, the active status of a judge, and other factors may be validated in the case of the warrant example to ensure that they match predetermined lists or simply comply with the proper data format. The result generated by implementation of the service may be transformed or adapted to a predetermined format.

The third step is to forward the generated (and optionally validated) result to at least one internal or external target or consumer of that result. The target or consumer of the result could be a human user of the system or a computerized system that will store, forward, or further process the information.

The forwarding of the result from implementing the service may be controlled, limited, or redacted in accordance with the governance criteria originally retrieved from the packet. With regard to issuance of a warrant, for example, certain consumers of the data may be entitled to see all of the data generated, such as a full case history or prior arrest record, while others may only be authorized to see the current warrant information.

Step four begins the iterative cycle of checking to see if there is a subsequent service identified in the packet after completion of the above steps with respect to the first service and invoking any subsequent services referenced in the packet in accordance with the control-flow language. Steps one through three, including the retrieval and determination of governance criteria, execution, validation, transformation, and forwarding steps are repeated until all commands in the packet have been processed and all services identified in the command structure invoked. FIG. 13 depicts the code to sequentially call services embedded in the XML packet. The architecture described by the invention also supports service chaining in which a service calls a subordinate service without first returning to the control or to a static command, allowing recursive calling of services to facilitate even greater automation of highly repetitive or mechanical processes.

Step five is the archiving the packet populated with results of the services invoked in a data store. In the case of the warrant, this would include storing the warrant with all data entered and all required approvals recorded and tamper sealed in a database for further retrieval, examination, or production into evidence as may be subsequently required. The subsequent examination of the document, in the context of the full packet, enables a complete reconstruction of the processes by which the document was created, when and by whom it was manipulated and viewed, and verification of its integrity by means of the audit trail and tamper sealing of the packet. The packet may also be indexed based on predetermined keys for efficient ad hoc retrieval at a later time.

Figure 7:
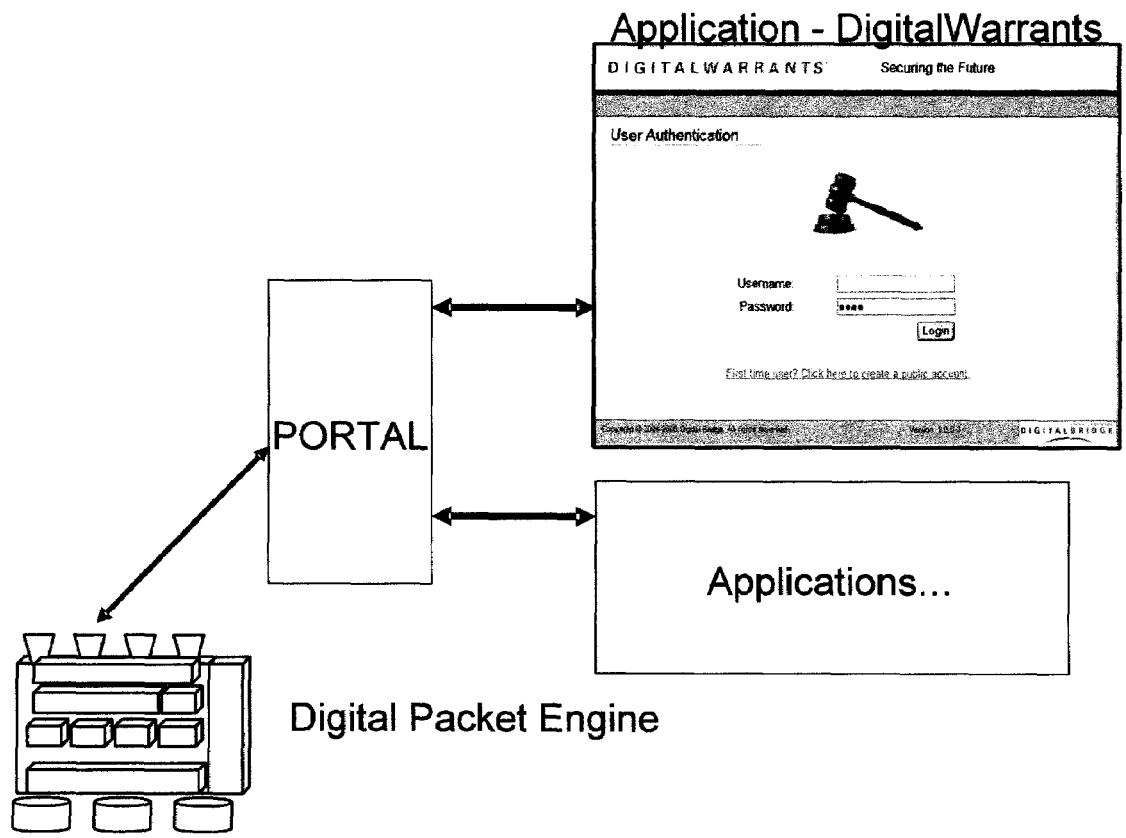
FIG. 7 depicts a windows based user interface for communicating to the system to process a user request.
Figure 8:
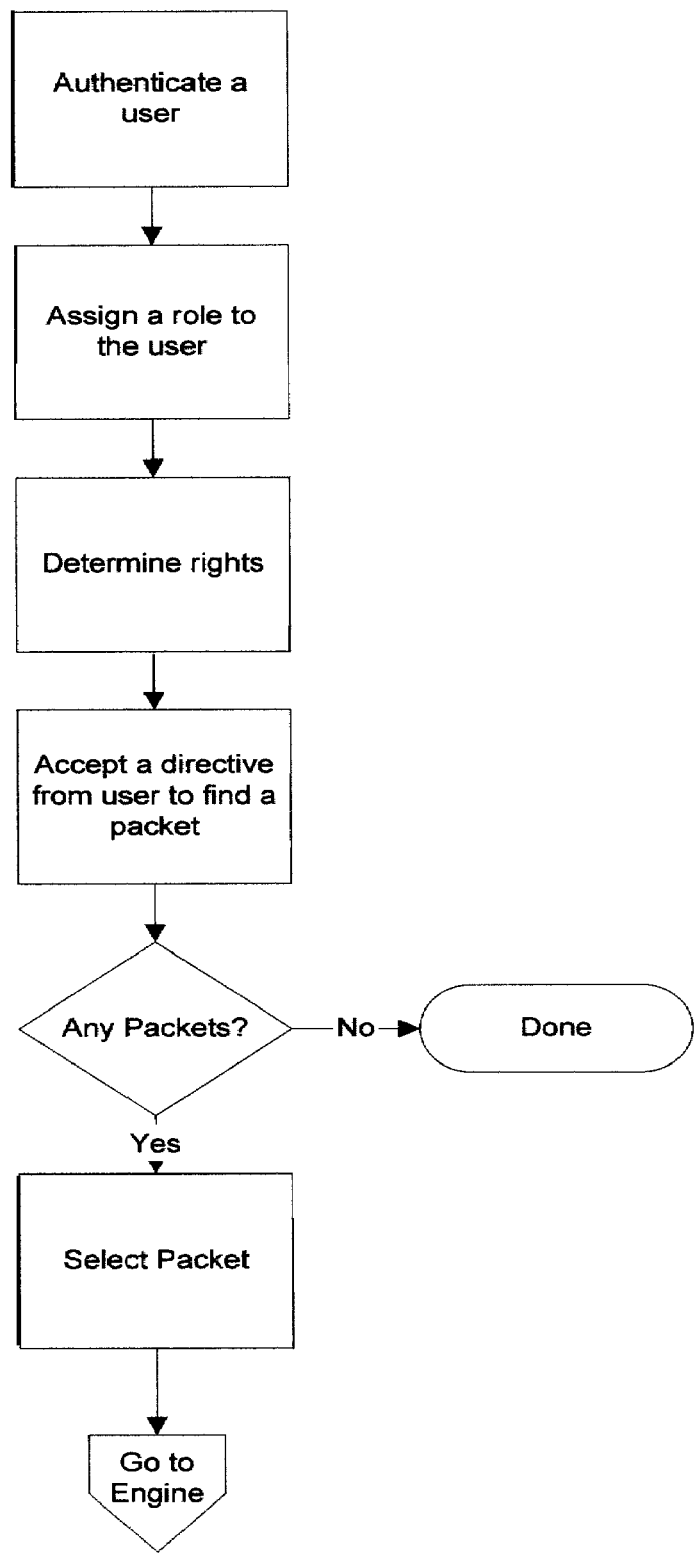
FIG. 8 depicts the handling of a user request or directive.

The invention also provides the specific means by which users process the XML packets that embody document data, rules, flow, work, audit and singing capabilities, enabling both human an automated users of the embodied documents to utilize the documents in real-world applications. FIG. 7 depicts a windows based user interface for the example involving digital warrants, communicating to the portal that accesses the system server and other applications referenced in a user request. FIG. 8 depicts the logical flow of the handling of a user request or directive within the system.

A user is first authenticated using standard computer authentication methodologies as known in the art, including passwords protection, utilization of SSL authentication, and other methods. Authentication of a user, whether human or computerized, may include a determination of a specific level of authentication defined by the XML document governance rules. This enables authentication of users having different roles to have access to view or create documents, to add, modify or delete material, or to perform other predetermined roles. Each user is assigned at least one role based on their authentication status.

Once authenticated the architecture enables the determination of a specific predefined set of rights and privileges of the user based on the level of authentication. The system provides for a default role for users not otherwise classified as part of the master applications grid. Normally this default role would be the role with the fewest rights and privileges with respect to the document. Roles may be based on membership in predefined categories or on specific identification of the user.

For example, with respect to the issuance of warrants, a judge might be identified by being a member of a predetermined list of judges, those judges assigned to a specific district or duty, or the name of the judge to which a specific case is assigned. Police officers and attorneys may be assigned different roles based on similar criteria. Typically, each role would include all the rights and privileges of those users that are supervised by such a role, in addition to rights appropriate to a supervisory level.

Once a user is authenticated and the appropriate role determined, the system may accept directives from the user consistent with the rights and privileges of that role, independent of whether the user is a human or another computer system. Each such directive comprises an event handled by invention's architecture in accordance with the series of event handling instructions describe above.

The directive from the user identifies any packets associated with the requested action. The packets may be retrieved for further processing or only certain data extracted from the packets may be required to provide a response to a specific directive. The returned packet may be a predetermined default option identified in the MAG view for that particular directive. If no packets are identified associated with the user's directive generate the response indicated by the directive for a null result. For example, if a user requested information about a certain type of warrant or warrants with respect to a particular case, and none existed, rather than returning the packet, a message may be generated indicated that no records were found.

If one or more packets are identified associated with the user's directive the user determines which, if any, of the packets are response to the specific need. A human user, for example, may retrieve a set of packets, or a subset of data retrieved from a set of packets that relate to a particular person, event, or subject and select from among the retrieved information, the specific instance that best meets the current requirement. Similarly, a computerized service acting as a user may further filter and select from a set of retrieved packets the one(s) that best match the query and will be retrieved or retained for further manipulation. If the identified packets associated with the user's directive do not meet any additional user criteria the system can generate the exception associated with that result.

Figure 9:
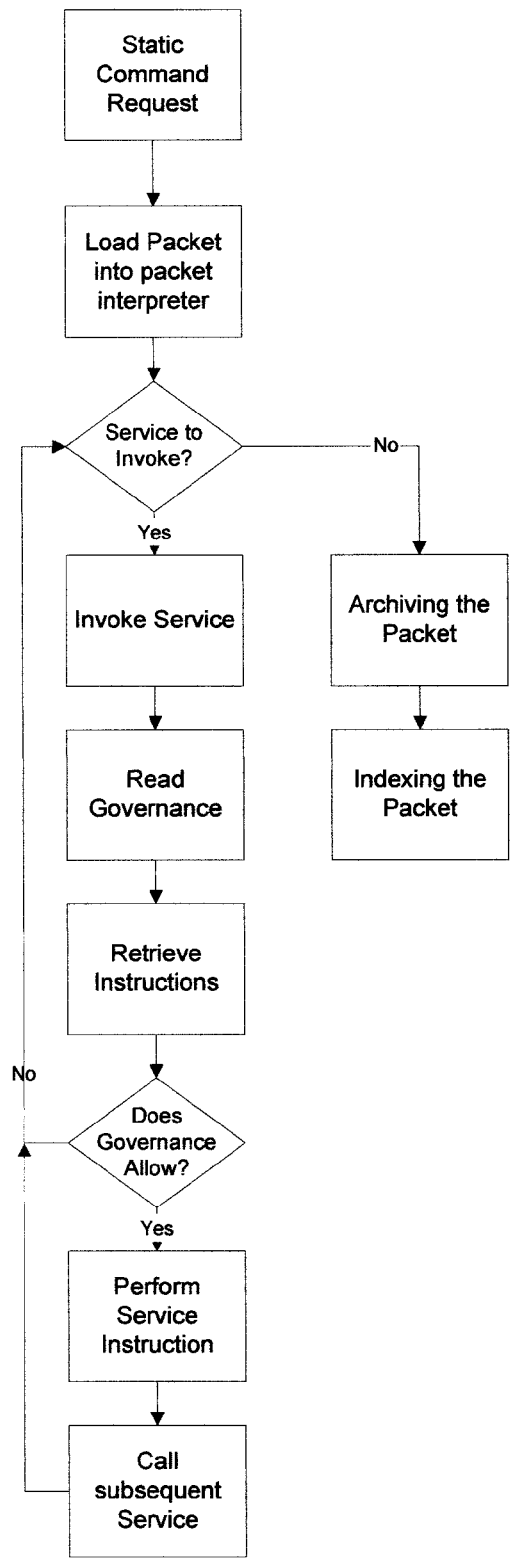
FIG. 9 depicts the handling of a static command embedded in a user request or directive.

The system next retrieves the first packet selected by the user from those identified in response to the user's directive or further selected by the user. Any static commands that comprise part of the user's directive are then executed with respect to the first packet retrieved in response to the directive. These static commands may include examination of material embedded in the packet as described above. These static commands may include reading any governance criteria, determination of access and roles, time-boxing requirements, and control language associated with the services embedded in the packet to first whether an results or portions of a result generated by the services in the packet will require limitation, restriction, modification, or redirection. FIG. 9 depicts the flow of execution of a static command embedded in a user request or directive.

For example, a user directive from the public to examine issued warrants may include a static command to limit or redact the information only to that subset of the data embedded in the packet that is legally classified as a public document. An analogous request from the police to view warrants, conversely, would enable the viewing of more complete information. The static command in essence comprises a single service without additional parameters and provides an efficient way to handle standard reporting for repetitive requirements.

Following the execution of these static commands, the instructions for the first service in the packet are executed in accordance with the process described above. The instructions for the service are performed using the embedded control language and logic to return a result consistent with the governance criteria and filtered in accordance with any static commands imposed in connection with the user's directive. As described above in connection with packet structure, the result may be validated or transformed or adapted in accordance with predetermined rules to match the required structure or format for final use of the returned information.

Following any validation or transformation of the result, it is forwarded to the internal or external consumer of the information generated by implementation of the service. As noted above, the result may be limited or redacted according to predetermined rules based on the applicable governance criteria.

The process is repeated for all subsequent services identified in the first packet returned in response to the user's directive. If multiple packets were returned, following completion of the first packet, the process is recursively repeated until all packets meeting the user's criteria have been executed in accordance with the instructions initiated by the user's directive.

Figure 10:
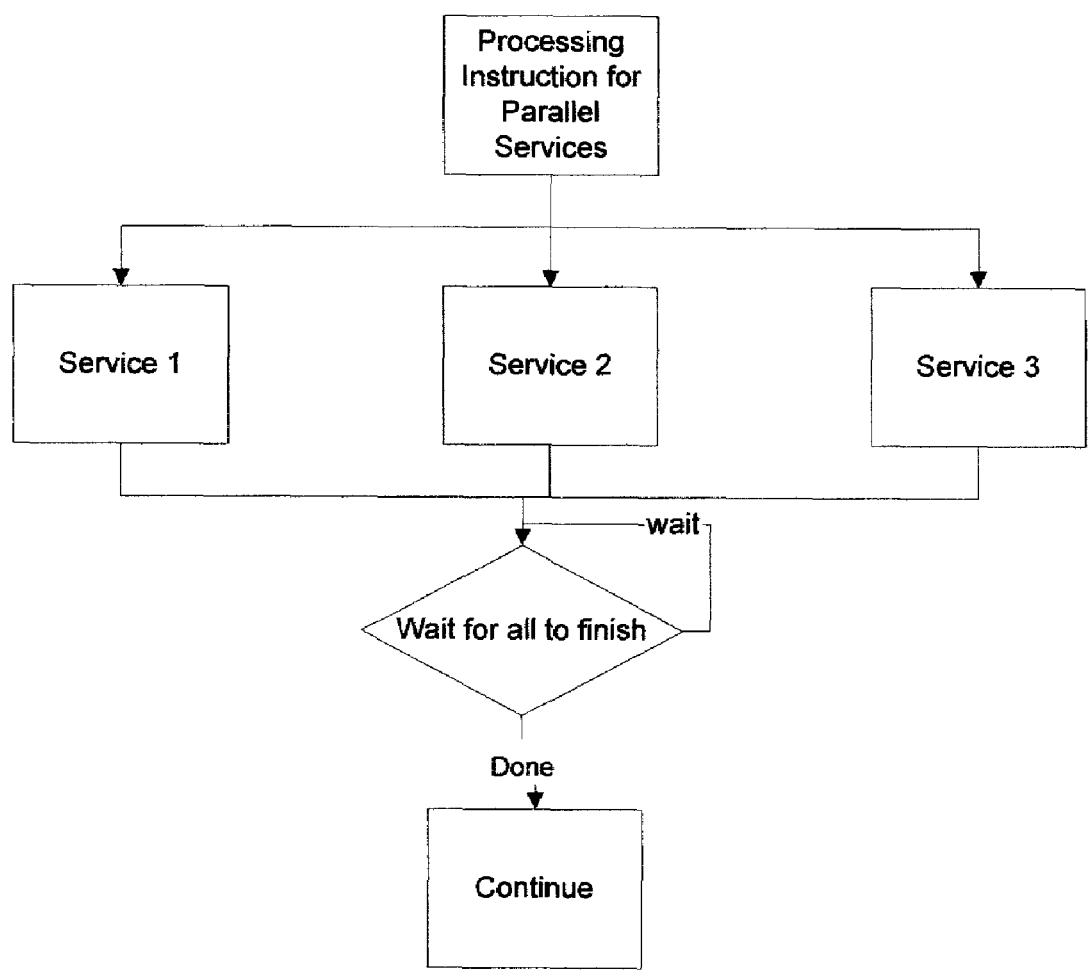
FIG. 10 depicts the parallel processing of services within a single server.
Figure 11:
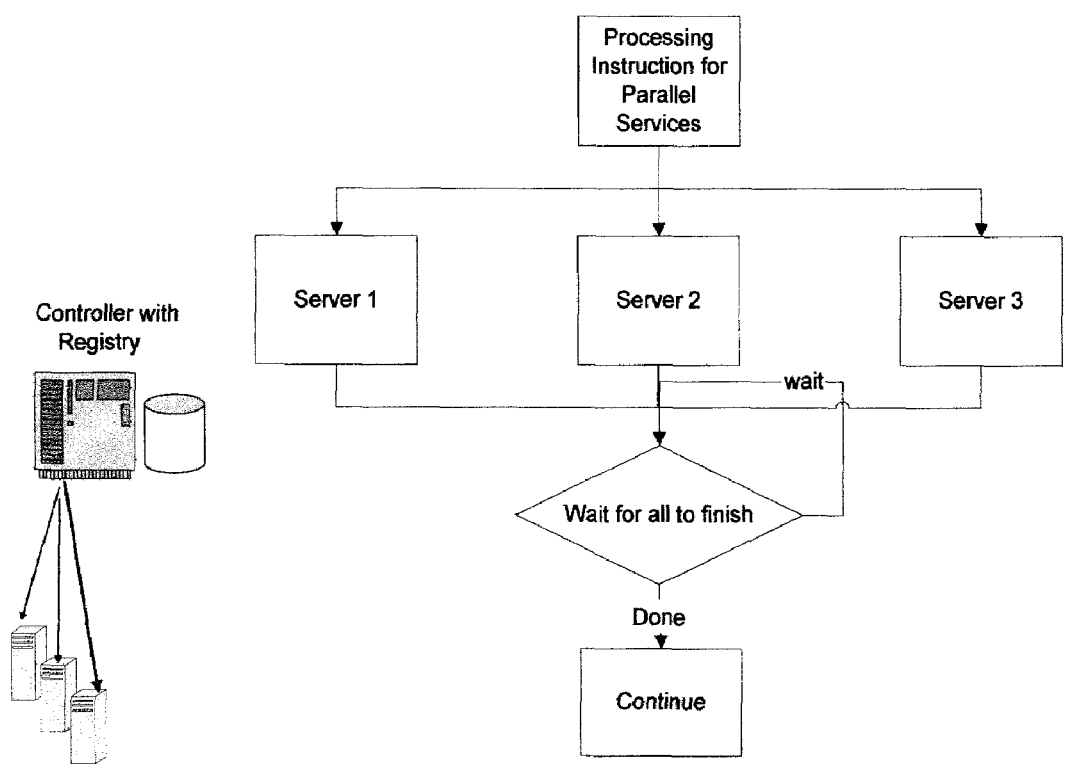
FIG. 11 depicts the parallel processing of services among distributed servers.

While the invention provides a natural capability to process sequential commands in an ordered fashion, it also supports parallel processing of commands as different services or recursive calls to the same server may be distributed to different services as depicted in FIG. 10 or to different servers as depicted in FIG. 11. The results can be stored as received and reassembled in proper order to produce the same result as if the services had been executed in sequential order.

Although embodiments of the present invention have been described, various modifications and changes may be made by those skilled in the art without departing from the spirit and scope of the invention.

The invention claimed is:

1. A method for creation and management of intelligent, self-contained packets containing all control flow, logic, governance criteria and instructions, the method comprising the steps of:
   recognizing a trigger event that initiates a process;
   correlating the triggering event to a packet of a predetermined type having instructions contained in the packet to execute at least one service;
   loading the packet into a packet interpreter;
   determining the presence of a control-flow language in the packet that governs sequence and logic for the at least one service;
   invoking a first service referenced in the packet by:
      reading any governance criteria in the packet associated with the first service to determine if any portions of a result generated by the first service require limitation, restriction, modification, or redirection;
      retrieving instructions for the first service from the packet;
      determining whether governance permits performance of the retrieved instructions for the first service;
      performing any permitted instructions for the first service using embedded control language and logic to generate a result in accordance with any governance criteria;
      optionally validating the result;
      optionally transforming the result to a predetermined format; and
      forwarding the validated result to a consumer of the result generated by service portions of which result may be redacted based on governance criteria;
   invoking any subsequent services referenced in the packet in accordance with the control-flow language contained in the packet and repeating the steps of reading, retrieving, determining, performing, validating, transforming, and forwarding until all services have been invoked;
   archiving the packet populated with results of the services invoked in a data store; and
   indexing the packet for subsequent retrieval.

2. The method of claim 1 further comprising a step of automatic service chaining in which a service calls a subordinate service.

3. The method of claim 1 further comprising a step of packets recursively calling other packets or access pointers to packets to return downstream information to the user.

4. The method of claim 1 further comprising the use of pointers to access internal or external data or services.

5. The method of claim 1 further comprising parallel processing of commands.

6. A method for processing, retrieving, transforming, reordering, filtering, moving, or deleting information from indexed, self-contained packets comprising the steps of:
   authenticating a user including determining a level of authentication;
   assigning a role to the user based on the level of authentication;
   determining a set of rights and privileges of the user based on the level of authentication;
   accepting a directive from the user consistent with the role of the user;
   interpreting the directive from the user;
   determining if any indexed packets are associated with the directive from the user;
   if any indexed packets are associated with the directive from the user, generating a response indicated by the directive;
   if no indexed packets are associated with the directive from the user, generating a null result response;
   if the indexed packets associated with the directive from the user do not meet any additional user criteria, generating an exception response indicative of that result;
   retrieving a first packet selected by the user from the packets identified by the directive from the user;
   executing static commands embedded in the directive from the user on the first selected packet by:
      reading any governance criteria associated with the first service to determine if any portions of a result generated by the first service require limitation, restriction, modification, or redirection;
      retrieving instructions for the first service from the packet;
      determining whether governance permits performance of the retrieved instructions for the first service;
      performing any permitted instructions for the first service using control language and logic embedded in the first selected packet to generate a result in accordance with any governance criteria embedded in the first packet;
      optionally validating the result;
      optionally transforming the result to a predetermined format; and forwarding the validated result to a consumer of the result generated by service portions of which result may be redacted based on governance criteria; and repeating the execution steps until all static commands embedded in the directive from the user have been executed.

7. The method of claim 6 wherein static commands are executed on retrieval based on permissions of the user accessing the packet.

8. A method for handling packets comprising the steps of:

correlating a triggering event to a packet, the packet being self-contained by having all instructions, governance criteria, logic and control flow to execute a service;

loading the packet into a packet interpreter;

invoking the service by:
 reading any governance criteria contained in the packet associated with the service;
 retrieving instructions for the service from the packet;
 determining whether governance permits performance of the retrieved instructions; and
 performing any permitted instructions contained in the packet for the service to generate a result in accordance with the governance criteria;

forwarding the result to a consumer;

archiving the packet populated with the result in a data store; and indexing the packet for subsequent retrieval.

9. The method of claim 8 further comprising the steps of:
validating the result of the performance of the instructions; and
transforming the result to a predetermined format.

10. The method of claim 8 further comprising the step of invoking a second service referenced in the packet and repeating the steps of reading, retrieving, determining, performing, and forwarding until the second service has generated a second result.

11. The method of claim 10 in which the second service is invoked in accordance with a control-flow language.

12. The method of claim 8 further comprising the step of redacting a portion of the result based on the identity of the consumer and in accordance with the governance criteria.

13. The method of claim 8 further comprising the step of automatic service chaining in which the service calls a subordinate service.

14. The method of claim 8 further comprising the step of the packet recursively calling a second packet or an access pointer to a second packet to return downstream information to the consumer.

15. The method of claim 8 further comprising the use of pointers to access internal or external data or services.

16. The method of claim 10 further comprising parallel processing of commands.

17. A method for processing, retrieving, transforming, reordering, filtering, moving, or deleting information from indexed, self-contained packets comprising the steps of:

authenticating a user;
assigning a role to the user;
determining a set of rights and privileges of the user;
accepting a directive from the user;
generating a response indicated by the directive;
retrieving a first packet from the indexed packets;
executing commands embedded in the directive on the first packet by:
 reading any governance criteria associated with a first service;
 retrieving instructions for the first service from the packet;
 performing any permitted instructions for the first service using control language and logic embedded in the first packet to generate a result in accordance with the governance criteria embedded in the first packet; and
forwarding the result to a consumer.

18. The method of claim 17 wherein static commands are executed on retrieval based on permissions of the user accessing the packet.

19. The method of claim 17 wherein the user is authenticated based on determining a level of authentication.

20. The method of claim 19 wherein the user is assigned a role based on the level of authentication.

21. The method of claim 19 wherein the user is assigned the set of rights and privileges based on the level of authentication.

22. The method of claim 17 further comprising the step of repeating execution steps until all static commands embedded in the directive have been executed.

23. The method of claim 17 further comprising the step of interpreting the directive.

24. The method of claim 17 further comprising the step of determining if any indexed packets are associated with the directive from the user.

25. The method of claim 17 wherein the response generated takes into account whether any indexed packets are associated with the directive from the user and, if not, the response is a null result response.

26. The method of claim 17 further comprising the step of determining whether the indexed packets associated with the directive meet any additional user criteria, and if not, generating an exception response indicative of that result.

27. The method of claim 17 wherein the performance of permitted instructions for the first service is conducted using control language and logic embedded in the first packet.

28. The method of claim 17 further comprising the step of determining whether the governance criteria embedded in the first packet permits performance of the retrieved instructions.

29. The method of claim 17 further comprising the step of determining whether if any portions of the result generated by the first service require limitation, restriction, modification, or redirection.

30. The method of claim 17 further comprising the step of forwarding the validated result to a consumer of the result generated by service portions of which result may be redacted based on governance criteria.

31. The method of claim 17 further comprising the steps of:
validating the result; and
transforming the result to a predetermined format.

* * * * *